(12) United States Patent
Yamauchi et al.

(10) Patent No.: US 6,523,638 B1
(45) Date of Patent: Feb. 25, 2003

(54) STEERING APPARATUS FOR VEHICLE

(75) Inventors: Yoji Yamauchi, Toyota (JP); Takashi Yamamoto, Seto (JP); Tadayuki Suzuki, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/215,267

(22) Filed: Dec. 18, 1998

(30) Foreign Application Priority Data

Jan. 30, 1998 (JP) .............................. 10-019315

(51) Int. Cl.$^7$ ................................. B62D 6/00
(52) U.S. Cl. ........................ 180/446; 701/71
(58) Field of Search ..................... 180/446, 443, 180/410, 412; 701/41, 42

(56) References Cited

U.S. PATENT DOCUMENTS 4,658,927 A * 4/1987 Kanazawa ............ 180/446 X
5,423,391 A * 6/1995 Shimizu .................. 701/42 X
5,907,277 A * 5/1999 Tokunaga ............... 180/446 X
6,041,887 A * 3/2000 Kojo et al. ................. 180/446

FOREIGN PATENT DOCUMENTS

| JP | A-62-238166 | 10/1987 | |
| JP | A-63-227472 | 9/1988 | |
| JP | 40-4283168 A * | 10/1992 | ............ B62D/6/00 |

* cited by examiner

*Primary Examiner*—F. Zeender
(74) *Attorney, Agent, or Firm*—Oliff & Berridge, PLC

(57) ABSTRACT

When a deviation becomes large between a target rotation angle $\theta si$ and an output angle $\theta p$, a correction process by a correction process section is started. This correction process is to alter the target rotation angle $\theta si$ so as to make the deviation smaller and to alter the transmission ratio set by a setting section, based on the target rotation angle $\theta si$ after the alteration and on an input angle $\theta h$.

11 Claims, 5 Drawing Sheets

STEERING APPARATUS FOR VEHICLE

BACKGROUND OF THE INVENTION

1. Field of the Invention

The present invention relates to a steering apparatus for vehicle provided with a so-called transmission ratio varying mechanism to permit alteration of a transmission ratio of turn angle of wheels to steering angle of a steering wheel.

2. Related Background Art

An example of the steering apparatus provided with such a transmission ratio varying mechanism is disclosed in Japanese Laid-open Patent Application No. Sho 63-227472, for example. As disclosed in this application, the transmission ratio varying mechanism is constructed in such structure that a prescribed gear mechanism connects an input shaft connected to the steering wheel side to an output shaft connected to the tie rod side and that this gear mechanism is driven by an actuator to permit alteration of the transmission ratio of rotations between the input shaft and the output shaft.

SUMMARY OF THE INVENTION

Control of driving of this actuator was executed by detecting a speed of the vehicle, a steering position of the steering wheel, and so on. When the steering wheel was manipulated at such a quick steering speed as to surpass response of the actuator, the actuator sometimes had a delay in follow-up. With occurrence of this delay in follow-up, even under such circumstances that a driver stopped manipulating the steering wheel after a quick steering operation, the actuator would operate by the degree corresponding to the follow-up delay to turn the wheels, and the driver could have an incompatible steering feeling.

The present invention has been accomplished in order to solve the above problem and an object thereof is to provide a steering apparatus for vehicle that can restrain the incompatible steering feeling caused by the follow-up delay of the actuator even under such circumstances of quick steering operation.

This steering apparatus for a vehicle comprising: (A) a transmission ratio varying mechanism capable of varying a transmission ratio of rotational angle of an output shaft to an input shaft connected to a steering handle; and (B) a steering control device that controls the transmission ratio, setting the transmission ratio by correcting an original transmission ratio when the difference between real and target rotational angles of the output shaft is greater than a predetermined value, the corrected transmission ratio being equal to or less than the original transmission ratio.

More precisely, the steering apparatus for vehicle is a steering apparatus for vehicle comprising a transmission ratio varying mechanism capable of varying a transmission ratio of turn angle to steering angle, the steering apparatus for vehicle comprising: steering angle detecting means for detecting a steering angle of a steering wheel; turn angle detecting means for detecting a turn angle of a wheel; transmission ratio setting means for setting the transmission ratio according to a running condition of vehicle; target turn angle setting means for setting a target turn angle of the wheel according to the steering angle detected by the steering angle detecting means, based on the transmission ratio set by the transmission ratio setting means; driving control means for controlling driving of the transmission ratio varying mechanism, based on a deviation between the turn angle of the wheel and the target turn angle; and compensating or correcting means for starting a compensation or correction process when the deviation is larger than a predetermined threshold value, the compensating means comprising target turn angle altering means for altering a value of the target turn angle so as to make the deviation smaller.

When the follow-up delay occurs in the transmission ratio varying mechanism because of the quick steering operation or the like, the deviation increases between the target turn angle and an actual turn angle. For example, when the driver stops manipulating the steering wheel under such circumstances, the transmission ratio varying mechanism operates by the degree commensurate with this deviation under control of the driving control means. When this deviation becomes greater than the predetermined threshold value, the apparatus then goes into the compensation process by the compensating means to alter the value of the target turn angle by the target turn angle altering means, thereby changing the deviation to a smaller value.

The compensating means further comprises transmission ratio altering means for altering the transmission ratio set by the transmission ratio setting means, based on a target turn angle resulting from alteration by the target turn angle altering means.

The transmission ratio set by the transmission ratio setting means is altered by the transmission ratio altering means, whereby during the compensation process the target turn angle setting means sets the target turn angle according to the steering angle, based on the transmission ratio after the alteration.

This steering apparatus comprises return means for terminating the compensation process of the compensating means, based on a comparison result between the transmission ratio set by the transmission ratio setting means and a transmission ratio resulting from alteration by the transmission ratio altering means.

When the comparison result between the transmission ratios is, for example, such that values of the two transmission ratios are nearly equal to each other or such that the magnitude relation between the two transmission ratios is inverted, the return means terminates the compensation process of the compensating means to return control to the normal control based on the transmission ratio set by the transmission ratio setting means.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFFERD EMBODIMENTS

Embodiments of the present invention will be described with reference to the accompanying drawings.

Figure 1:
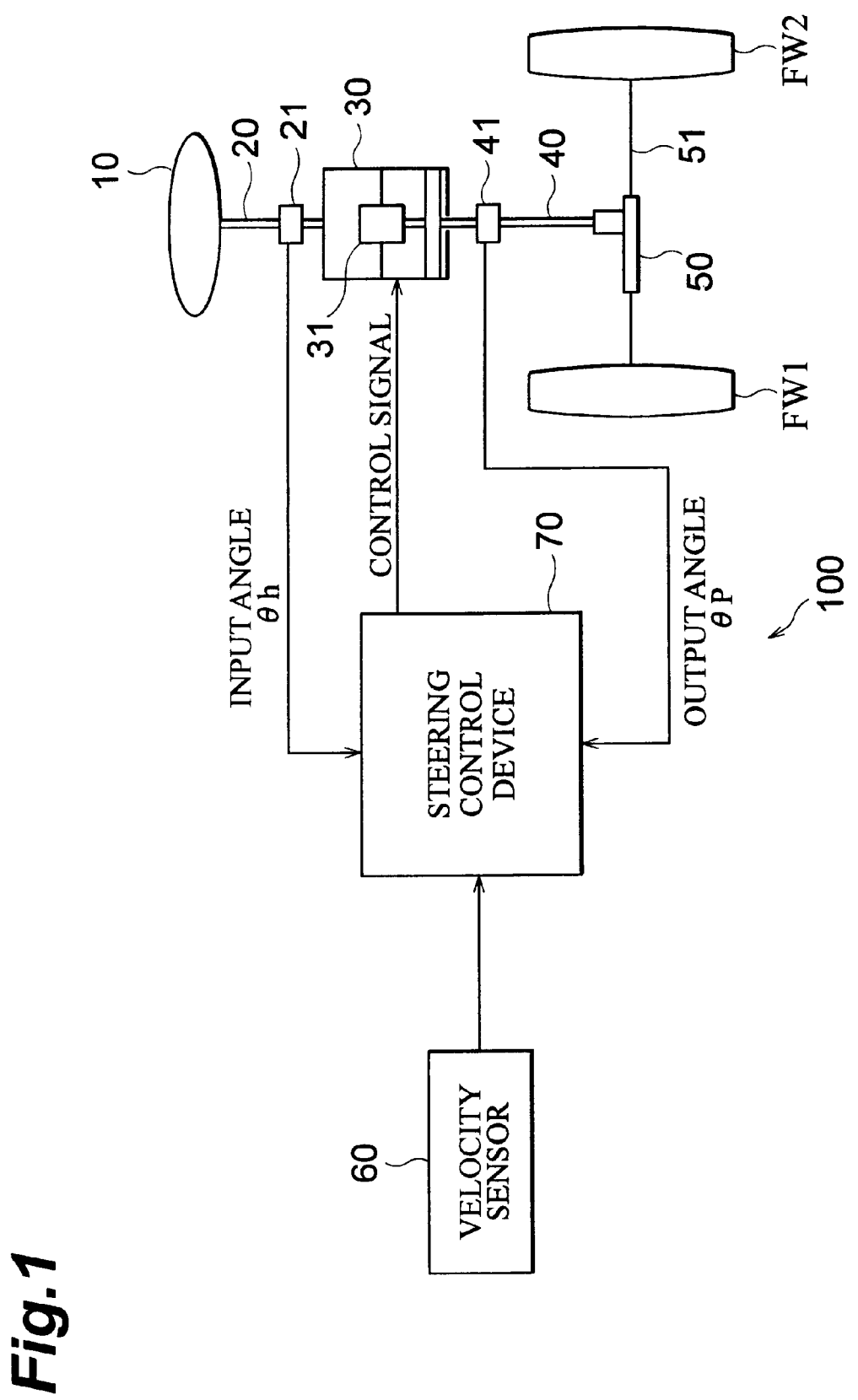
FIG. 1 is a structural diagram to schematically show the structure of the steering apparatus.

Illustrated in FIG. 1 is the structure of steering apparatus 100 according to an embodiment.

An input shaft 20 and an output shaft 40 are connected through a transmission ratio varying mechanism 30 and a steering wheel (handle) 10 is connected to the input shaft 20. The output shaft 40 is connected through a gear system 50 of the rack-and-pinion type to a rack shaft 51 and front wheels FW1, FW2 are connected to the both ends of the rack shaft 51.

The input shaft 20 is equipped with an input angle sensor 21 for detecting a steering position of the steering wheel 10 and the output shaft 40 is equipped with an output angle sensor 41 for detecting a rotational position of the output shaft 40. A rotational angle of this output shaft 40 corresponds to a stroke position of the rack shaft 51, and a stroke position of the rack shaft 51 to a turn angle of the wheels FW1, FW2. Thus, the turn angle of the wheels FW1, FW2 is detected by detecting the rotational angle of the output shaft 40 by the output angle sensor 41.

The transmission ratio varying mechanism 30 has a function to change the transmission ratio (gear ratio) as a ratio of turn amount of the wheels FW1, FW2 to steering amount of the steering wheel 10 and is provided with a motor as a driving source for changing this transmission ratio.

Control of driving of the transmission ratio varying mechanism 30 is executed by steering control device 70, and the steering control device 70 outputs a control signal to the motor 31, based on detection signals from the input angle sensor 21 provided for the input shaft 20, from the output angle sensor 41 provided for the output shaft 40, and from a velocity sensor 60 for detecting the velocity of the vehicle, to control the set transmission ratio of the transmission ratio varying mechanism 30.

Figure 2:
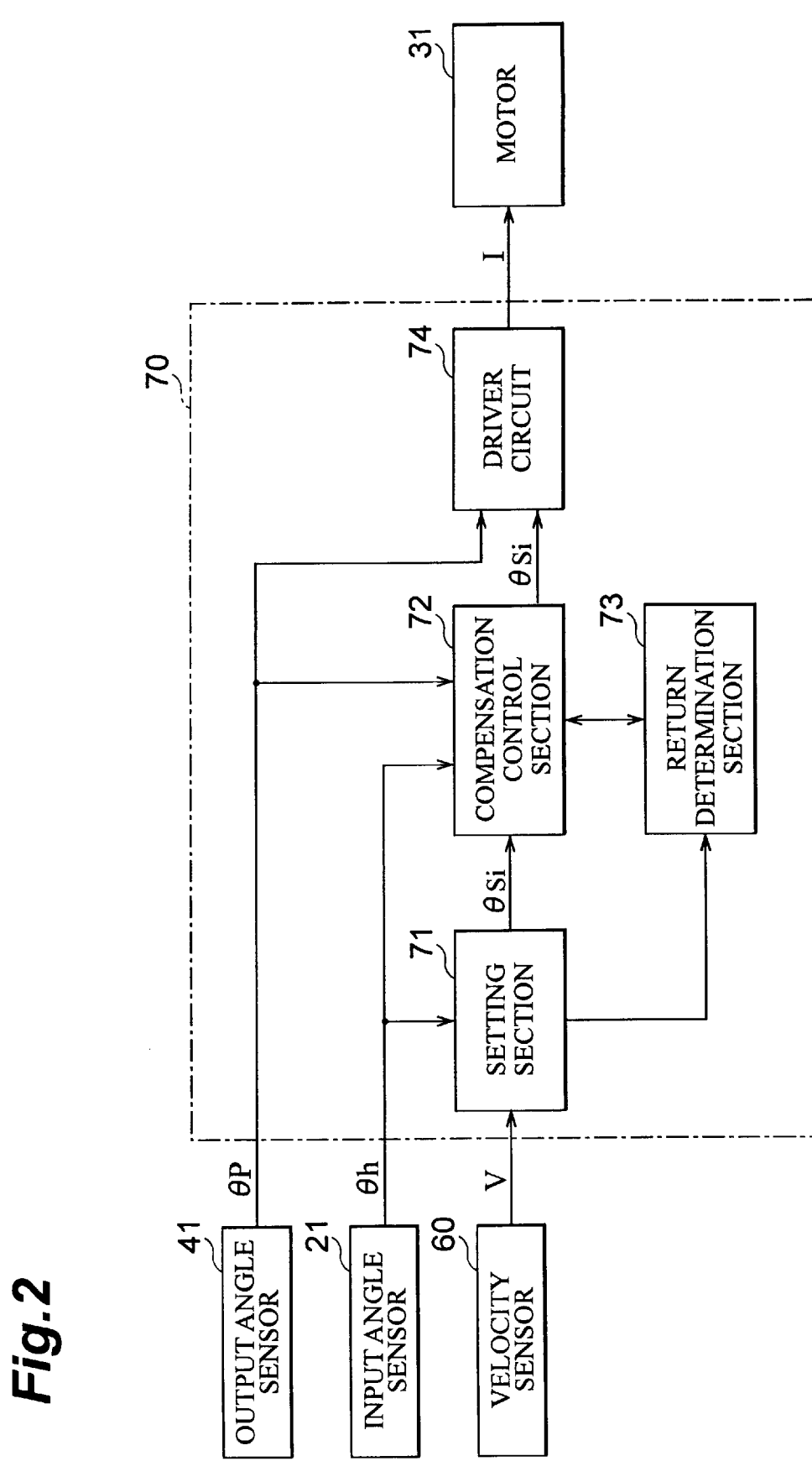
FIG. 2 is a block diagram to show the structure of the steering control device.

FIG. 2 illustrates the structure of the steering control device 70.

The steering control device 70 is composed of a setting section 71, a compensation or correction process section 72, a return determination section 73, and a driver circuit 74.

Figure 3:
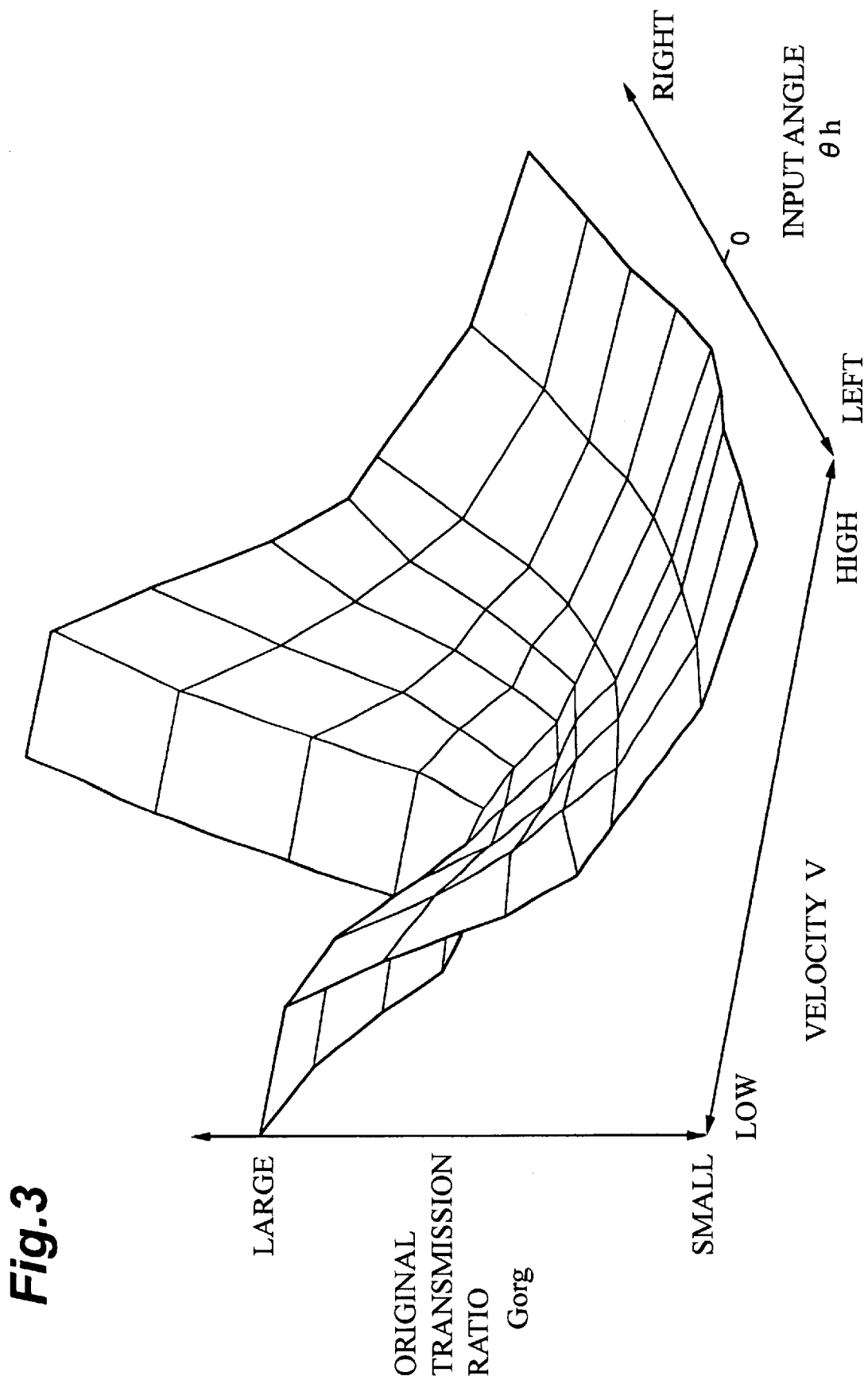
FIG. 3 is a three-dimensional map to show the relationship of original transmission ratio determined according to the velocity and input angle.

The setting section 71 includes a three-dimensional map, for example, as shown in FIG. 3 and searches the map, based on the two detection results of the input angle sensor 21 and the velocity sensor 60, to set an original transmission ratio Gorg according to the running condition of the vehicle. Then the setting section 71 sets a target rotation angle θsi of the output shaft 40 as a target of control, based on the original transmission ratio Gorg thus set and the input angle θh detected by the input angle sensor 21.

The compensation control section 72 starts the compensation process when the deviation e between the target rotation angle θsi set by the setting section 71 and the output angle θp detected by the output angle sensor 41 becomes larger than a threshold value eth described hereinafter. In this compensation process, the value of the target rotation angle θsi is altered so as to make smaller the absolute value of the deviation e between the target rotation angle θsi and the output angle θp and, based on the value of the target rotation angle θsi after the alteration, the original transmission ratio Gorg set by the setting section 71 is altered to a compensated transmission ratio Gcom. After that, the compensation control section 72 continues the process of setting the target rotation angle θsi according to the input angle θh and the velocity V, based on this compensated transmission ratio Gcom.

The return determination section 73 determines whether the compensation process by the compensation control section 72 is to be terminated, based on the two values of the original transmission ratio Gorg set by the setting section 71 and the compensated transmission ratio Gcom set by the compensation control section 72.

The driver circuit 74 is a circuit for outputting driving current I to the motor 31, according to the deviation e between the target rotation angle θsi outputted from the compensation process section 72 and the output angle θp detected by the output angle sensor 41.

Now, let us explain the processes of the steering control device 70 constructed as described above, along the flowchart of FIG. 4 with reference to FIG. 2.

Figure 4:
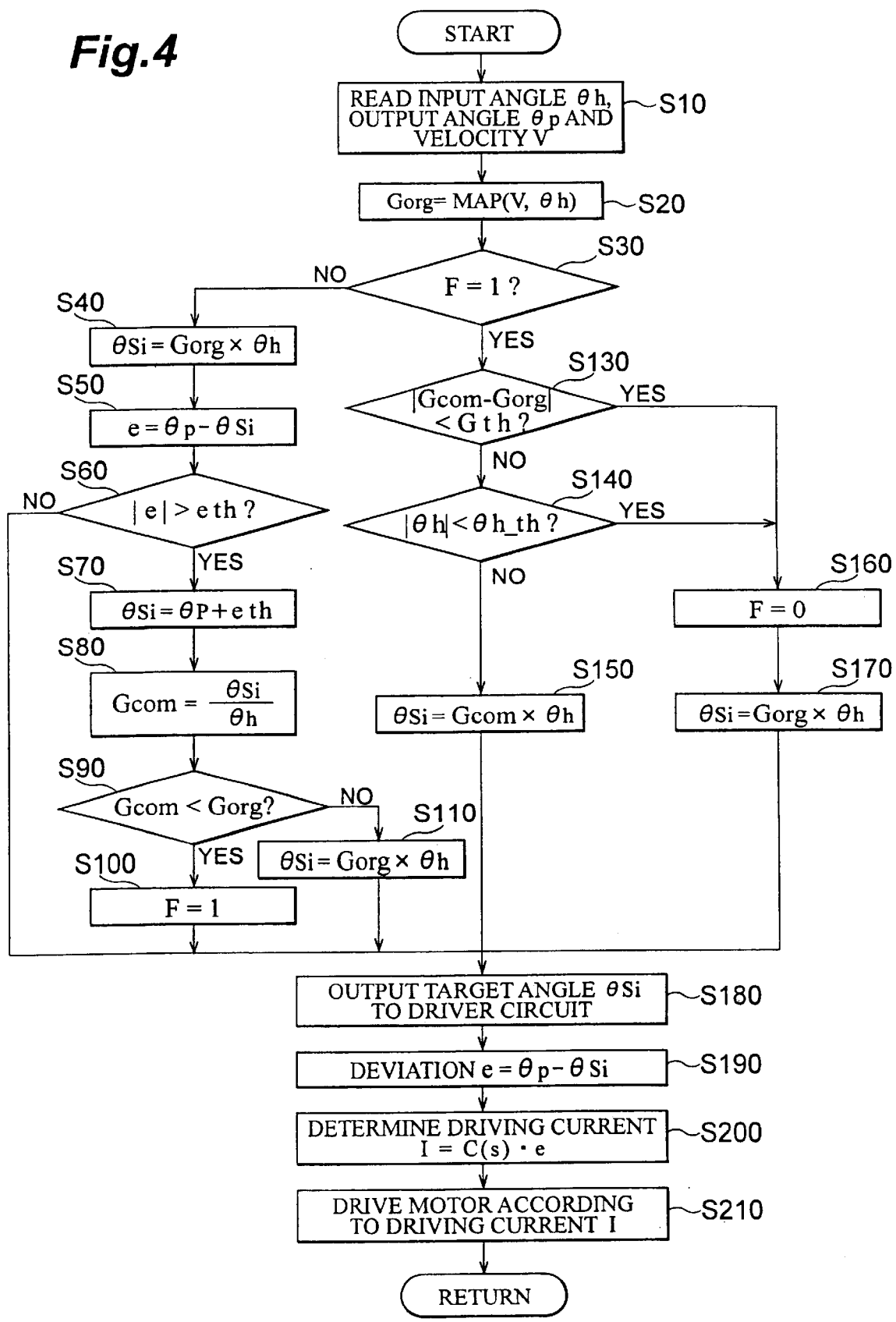
FIG. 4 is a flowchart to show the processes executed in the steering control device.

The flowchart shown in FIG. 4 is started by an on operation of the ignition switch. At the start a reset process of flag F described hereinafter is first executed and thereafter the flow proceeds to step (hereinafter denoted by"S") 10 executed in the setting section 71 to read each of the values of the velocity V detected by the velocity sensor 60, the input angle θh detected by the input angle sensor 21, and the output angle θp detected by the output angle sensor 41.

In subsequent S20, the map illustrated in FIG. 3 is searched based on the values of the velocity V and input angle θh read in S10 to set the original transmission ratio Gorg according to the running condition of the vehicle.

In next S30, it is determined whether the flag F to indicate progress of execution of the compensation process is set at 1. Since the flag F is reset to 0 at the start, the determination is "No" in the routine immediately after the start and the flow thus goes to S40.

In next S40, θsi=Gorg×θh is computed, based on the input angle θh read in S10 and the original transmission ratio Gorg set in S20, to set the target rotation angle θsi of the output shaft 40 and then the flow moves to the processes in and after S50 executed in the compensation control section 72.

In S50 the deviation e is computed by e=θp−θsi, based on the output angle θp, which is the actual rotation angle of the output shaft 40, and the target rotation angle θsi set in S40.

In next S60, it is determined whether the absolute value of this deviation e is larger than the threshold value eth. This threshold value eth is preset as such a small value as to adequately restrain occurrence of the incompatible steering feeling even in the case where the wheels FW1, FW2 are turned after stop of steering because of the follow-up delay of the motor 31. Since eth≧|e| in the case of the normal manipulation of the steering wheel, the determination in S60 is "No" and then the flow goes to S180.

In S180 a signal according to the target rotation angle θsi set in the process before S180 is outputted to the driver circuit 74 and then the flow moves to the processes in and after S190 executed in the driver circuit 74. In this case the signal according to the target rotation angle θsi set in previous S40 is outputted to the driver circuit 74.

In S190 the deviation e between the output angle θp and the target rotation angle θsi set in S180 is again set as e=θp−θsi and in next S200 the driving current I of the motor 31 is determined so as to null the deviation e without overshoot. An example of this process is such that the driving current I is determined by properly setting parameters of PID control, based on the operation expression of I=C(s)·e. In the expression "s" is the Laplace operator.

In next S210 the driving current I determined in S200 is outputted to the motor 31 to rotate the motor 31.

By repetitively carrying out the above operation, the original transmission ratio Gorg according to the running condition of the vehicle is set and, based on this original transmission ratio Gorg, the steering control is carried out according to the velocity V and the input angle θh.

On the other hand, when the absolute value of the deviation e between the output angle θp and the target rotation angle θsi becomes larger than the threshold eth, for example, on the occasion of the quick steering operation or the like, the determination in previous S60 is "Yes" and then the flow goes to S70.

In S70 the value of the target rotation angle θsi set in S40 is altered to the sum of the output angle θp and the threshold eth. In other words, this process is to replace the deviation e between the output angle θp and the target rotation angle θsi with the value of the threshold eth, so that this process alters the deviation e between the output angle θp and the target rotation angle θsi to a smaller value than the actual value.

In next S80, a transmission ratio (θsi/θh) obtained from the input angle θh and the target rotation angle θsi set in S70 is set as the compensated transmission ratio Gcom and in next S90 the compensated transmission ratio Gcom set in S80 is compared with the value of the original transmission ratio Gorg.

When the comparison result is that the value of the compensated transmission ratio Gcom is smaller than the original transmission ratio Gorg ("Yes" in S90), the flow goes to S100 to set the flag F to indicate progress of execution of the compensation process to 1 and then the flow goes to S180. In this case, S180 is to output a signal according to the target rotation angle θsi set in S70 to the driver circuit 74 and the processes in and after S190 are executed based on the target rotation angle θsi after the alteration.

When the input angle θh is a small value near the neutral steering angle, the compensated transmission ratio Gcom in S80 may be set to a large value not less than the original transmission ratio Gorg in certain cases. In such cases, the determination in S90 is "No" and the flow goes to S110 to compute the value of the target rotation angle θsi by θsi=Gorg×θh using the original transmission ratio Gorg, so as to change the value of the target rotation angle θsi set in S70. After this, the flow proceeds to S180, and in this case, S180 is to output a signal according to the target rotation angle θsi set in S110 to the driver circuit 74. As a result, the normal control based on the original transmission ratio Gorg is carried out without moving to the compensation process.

As in previous S100 the flag F to indicate progress of execution of the compensation process is set to 1, the determination in S30 will be "Yes" in the next routine, and then the flow moves to the determination processes of S130 and S140 executed in the return determination section 73.

It is determined in S130 whether a difference (an absolute value) between the compensated transmission ratio Gcom and the original transmission ratio Gorg is smaller than a predetermined threshold Gth and it is determined in S140 whether the absolute value of the input angle θh is smaller than a predetermined threshold θhth, i.e., whether the vehicle is substantially in a straight driving state.

When both S130 and S140 result in determination of "No," the compensation process is continued. Namely, the flow goes to S150 to compute θsi=Gcom×θh to set the target rotation angle θsi according to the input angle θh read S10, based on the corrected or compensated transmission ratio Gcom set in S80. After this, the flow goes to the processes in and after S180, and in this case, S180 is to output a signal according to the target rotation angle θsi set in this S150 to the driver circuit 74. While both S130 and S140 result in the determination of "No," the compensation process to set the target rotation angle θsi according to the input angle θh, based on the compensated transmission ratio Gcom, is carried on.

In contrast with it, when it is found in S130 that the difference between the compensated transmission ratio Gcom and the original transmission ratio Gorg is smaller than the threshold Gth, it is determined that the compensated transmission ratio Gcom is almost equal to the original transmission ratio Gorg and the flow goes to S160 to reset the flag F to 0, thereby terminating the compensation process. When it is found in F140 that the absolute value of the input angle θh is smaller than the threshold θhth, it is determined that the vehicle is substantially in the straight driving state and the flow also goes to S160 to terminate the compensation process. The incompatible steering feeling due to alteration of transmission ratio can be adequately restrained by returning the control to the normal steering control at such timing.

Next S170 is to compute θsi=Gorg×θh to set the target rotation angle θsi according to the input angle θh read in S10, based on the original transmission ratio Gorg set in S20. After this, the flow goes to the processes in and after S180, and in S180 a signal according to the target rotation angle θsi set in S170 is outputted to the driver circuit 74.

In this way the return is effected from the compensation process based on the compensated transmission ratio Gcom to the normal steering control based on the original transmission ratio Gorg.

In the flowchart described above, S130 was to determine if |Gcom−Gorg|<Gth, but this determination may be replaced by determining if "Gcom≧Gorg?" or determining whether the magnitude relation between the compensated transmission ratio Gcom and the original transmission ratio Gorg is equal or inverted relation. When the magnitude relation is equal or inverted relation ("Yes" in S130), the compensated transmission ratio Gcom and the original transmission ratio Gorg cross each other and it can be determined that the two transmission ratios are almost equal. Thus, the compensation process may be terminated at this timing to return the control to the normal steering control based on the original transmission ratio Gorg.

Figure 5:
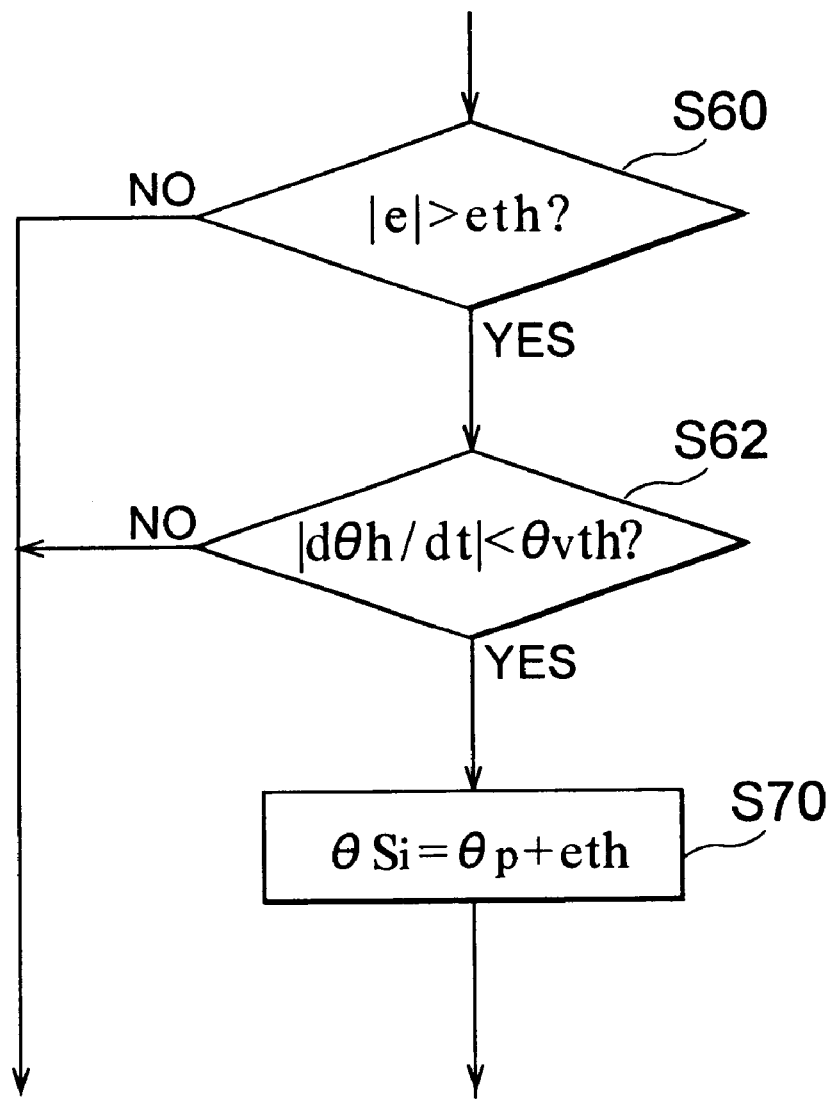
FIG. 5 is a diagram to show a modified part of the flowchart of FIG. 4, as another embodiment.

In the embodiment described above, the condition to move to the compensation process is met if the deviation e (absolute value) between the output angle θp and the target rotation angle θsi becomes larger than the threshold eth ("Yes" in S60); as another condition to move to the compensation process, S62 may be added between S60 and S70 as illustrated in FIG. 5. It is determined in S62 whether an absolute value of change rate of input angle θh, |dθh/dt|, is smaller than a predetermined threshold θvth. In this case, conditions to move to S70 are determinations of "Yes" in both S60 and S62. This is equivalent to the circumstances in which the deviation e (absolute value) between the output angle θp and the target rotation angle θsi is larger than the threshold eth because of the quick steering operation or the like ("Yes" in S60) and in which the manipulation of the steering wheel is almost stopped after the quick steering operation ("Yes" in S62). Only under such circumstances that the deviation e becomes large because of the quick steering operation and that the manipulation of the steering wheel is stopped thereafter, the compensation process discussed previously is carried out to adequately restrain the follow-up delay of the motor 31 occurring on this occasion accordingly.

As stated above, the steering apparatus for a vehicle comprises: (A) transmission ratio varying mechanism 30 capable of varying a transmission ratio of rotational angle of output shaft 40 to input shaft 20 connected to steering handle 10; and (B) steering control device 70 that controls the transmission ratio, setting the transmission ratio by correcting original transmission ratio Gorg when the difference e between real and target rotational angles θp, θSi of output shaft 40 is greater than a predetermined value eth, the corrected transmission ratio Gcom being equal to or less than the original transmission ratio Gorg.

Further, this original transmission ratio Gorg is determined using data on the vehicle's operational condition.

This operational condition is defined based on signals from an input angle sensor 21 for the steering handle 10, and a velocity sensor 60 for the vehicle.

This target rotational angle is obtained based on the original transmission ratio Gorg and the signal from said input angle sensor 21.

The real rotational angle is obtained based on a signal from output angle sensor 41 for the output shaft 40.

The steering control device 70 sets the finally corrected transmission ratio Gcom equal to the original transmission ratio Gorg when the original transmission ratio is smaller than the previously corrected transmission ratio (S90, S110).

In other words, the steering apparatus for vehicle comprises the target turn angle altering means for altering the value of the target turn angle so as to make smaller the deviation between the target turn angle set by the target turn angle setting means and the turn angle detected by the turn angle detecting means, so that, for example, on the occasion of increase in the deviation due to the quick steering operation or the like, this deviation can be altered to a smaller value, which can adequately restrain the incompatible steering feeling caused by the follow-up delay of the transmission ratio varying mechanism which would occur, for example, upon stop of steering operation.

The steering apparatus comprises the transmission ratio altering means for altering the transmission ratio set by the transmission ratio setting means, based on the target turn angle after the alteration by the target turn angle altering means, so that the driving control of the transmission ratio varying mechanism can be carried out, based on the transmission ratio after the alteration, during the period in which the compensation process by the compensating means is carried on.

The steering apparatus comprises the return means for terminating the compensation process of the compensating means, based on the comparison result between the transmission ratios respectively set by the transmission ratio setting means and by the transmission ratio altering means, so that the compensation process can be terminated, for example, when the two transmission ratios become almost equal, which can return the control to the normal control without giving the incompatible steering feeling to the driver.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering apparatus for reducing steering follow-up delay effects for a vehicle, comprising:
   (A) a transmission ratio varying mechanism capable of varying a transmission ratio of rotational angle of an output shaft linked to vehicle road wheels to an input shaft connected to a steering handle that rotates said input shaft; and
   (B) a steering control device that controls the transmission ratio, providing at least one corrected transmission ratio by correcting an original transmission ratio when the difference between real and target rotational angles of the output shaft is greater than a predetermined value, such that a finally corrected transmission ratio is set equal to or less than the original transmission ratio.

2. A steering apparatus according to claim 1, wherein said original transmission ratio is determined using data on the vehicle's operational condition.

3. A steering apparatus according to claim 2, wherein said operational condition is defined based on signals from an input angle sensor for the steering handle, and a velocity sensor for the vehicle.

4. A steering apparatus according to claim 3, wherein said target rotational angle is obtained based on the original transmission ratio and the signal from said input angle sensor.

5. A steering apparatus according to claim 4, wherein said real rotational angle is obtained based on a signal from an output angle sensor for the output shaft.

6. A steering apparatus according to claim 1, wherein the finally corrected transmission ratio is set equal to the original transmission ratio when the original transmission ratio is smaller than the at least one corrected transmission ratio.

7. A steering apparatus for reducing steering lag effects for a vehicle, comprising:
   a transmission ratio varying mechanism capable of varying a transmission ratio of a turn angle of a road wheel to a steering angle of the steering handle;
   steering angle detecting means for detecting the steering angle of the steering handle;
   turn angle detecting means for detecting the turn angle of the road wheel;
   transmission ratio setting means for setting said transmission ratio according to a running condition of a vehicle;
   target turn angle setting means for setting a target turn angle of the road wheel according to the steering angle detected by said steering angle detecting means, based on the transmission ratio set by said transmission ratio setting means;
   driving control means for controlling driving of said transmission ratio varying mechanism, based on a deviation between the turn angle of the road wheel and said target turn angle; and
   correcting means for starting a correction process when said deviation is larger than a predetermined threshold value, said correcting means comprising target turn angle altering means for altering a value of said target turn angle so as to make said deviation smaller.

8. The steering apparatus for vehicle according to claim 7, wherein said correcting means further comprises transmission ratio altering means for altering the transmission ratio set by said transmission ratio setting means, based on a target turn angle resulting from alteration by said target turn angle altering means.

9. The steering apparatus for vehicle according to claim 8, comprising return means for terminating the correction process of said correcting means, based on a comparison result between the transmission ratio set by said transmission ratio setting means and a transmission ratio resulting from alteration by said transmission ratio altering means.

10. A steering apparatus for reducing steering follow-up delay effects when a steering handle is rapidly turned in a direction different from the current direction for a vehicle, comprising:

(A) a transmission ratio varying mechanism capable of varying a transmission ratio of rotational angle of an output shaft linked to vehicle road wheels to an input shaft connected to a steering handle that rotates said input shaft; and (B) a steering control device that controls the transmission ratio, providing at least one corrected transmission ratio by correcting an original transmission ratio when the difference between real and target rotational angles of the output shaft is greater than a predetermined value, such that a finally corrected transmission ratio is set equal to or less than the original transmission ratio.

11. steering apparatus for reducing steering lag effects when a steering handle is rapidly turned in a direction different from the current direction for a vehicle, comprising:

a transmission ratio varying mechanism capable of varying a transmission ratio of a turn angle of a road wheel to a steering angle of the steering handle;

steering angle detecting means for detecting the steering angle of the steering handle;

turn angle detecting means for detecting the turn angle of the road wheel;

transmission ratio setting means for setting said transmission ratio according to a running condition of a vehicle;

target turn angle setting means for setting a target turn angle of the road wheel according to the steering angle detected by said steering angle detecting means, based on the transmission ratio set by said transmission ratio setting means;

driving control means for controlling driving of said transmission ratio varying mechanism, based on a deviation between the turn angle of the road wheel and said target turn angle; and correcting means for starting a correction process when said deviation is larger than a predetermined threshold value, said correcting means comprising target turn angle altering means for altering a value of said target turn angle so as to make said deviation smaller.

* * * * *